(12) United States Patent
Okada et al.

(10) Patent No.: US 12,552,769 B2
(45) Date of Patent: Feb. 17, 2026

(54) PYRIMIDINE DERIVATIVE

(71) Applicant: ASKA PHARMACEUTICAL CO., LTD., Tokyo (JP)

(72) Inventors: Makoto Okada, Kanagawa (JP); Youichi Nakano, Kanagawa (JP); Takashi Nose, Kanagawa (JP); Satoshi Maeda, Kanagawa (JP); Tomoaki Watanabe, Kanagawa (JP)

(73) Assignee: ASKA PHARMACEUTICAL CO., LTD., Tokyo (JP)

( * ) Notice: Subject to any disclaimer, the term of this patent is extended or adjusted under 35 U.S.C. 154(b) by 383 days.

(21) Appl. No.: 18/274,290

(22) PCT Filed: Feb. 1, 2022

(86) PCT No.: PCT/JP2022/003704
§ 371 (c)(1),
(2) Date: Jul. 26, 2023

(87) PCT Pub. No.: WO2022/168808
PCT Pub. Date: Aug. 11, 2022

(65) Prior Publication Data
US 2024/0083867 A1    Mar. 14, 2024

(30) Foreign Application Priority Data
Feb. 2, 2021    (JP) .................. 2021-015164

(51) Int. Cl.
C07D 401/04    (2006.01)
A61K 31/506   (2006.01)

(52) U.S. Cl.
CPC .................. C07D 401/04 (2013.01)

(58) Field of Classification Search
CPC .................. C07D 401/04; A61K 31/506
USPC .................. 544/319; 514/269
See application file for complete search history.

(56) References Cited

U.S. PATENT DOCUMENTS

| 10,710,967 | B2 | 7/2020 | Okada et al. |
| 2015/0087646 | A1 | 3/2015 | Gharat et al. |
| 2016/0002208 | A1 | 1/2016 | Maue et al. |
| 2020/0071280 | A1 | 3/2020 | Okada et al. |

FOREIGN PATENT DOCUMENTS

| JP | 5601422 B2 | 8/2014 |
| JP | 2015-523353 A | 8/2015 |
| JP | 2016-514104 A | 5/2016 |
| WO | 2013/186692 A1 | 12/2013 |
| WO | 2015/059618 A1 | 4/2015 |
| WO | 2015/125842 A1 | 8/2015 |
| WO | 2017/073709 A1 | 5/2017 |
| WO | 2019/044868 A1 | 3/2019 |

OTHER PUBLICATIONS

Office Action with Search Report issued in RU Patent Application No. 2023122596, Jul. 4, 2025, translation.
Proc. Natl. Acad. Sci. USA, vol. 96, Biochemistry, "Identification of human prostaglandin E synthase: A microsomal, glutathione-dependent, inducible enzyme, constituting a potential novel drug target", Per-Johan Jakobsson et al., Jun. 1999, pp. 7220-7225.
Pharmacol. Rev., vol. 59, "Membrane Prostaglandin E Synthase-1: A Novel Therapeutic Target", Bengt Samuelsson et al., 2007, pp. 207-224.
J. Biol. Chem., 279, "Reduced Pain Hypersensitivity and Inflammation in Mice Lacking Microsomal Prostaglandin E Synthase-1", Daisuke Kamei et al., 2004, pp. 33684-33695.
J. Biol. Chem., 280, "Redirection of Eicosanoid Metabolism in mPGES-1-deficient Macrophages", Catherine E. Trebino et al., 2005, pp. 16579-16585.
ISR issued in International Patent Application No. PCT/JP2022/003704, Apr. 5, 2022, translation.
IPRP issued in International Patent Application No. PCT/JP2022/003704, Aug. 3, 2023, translation.
EESR issued in EP Patent Application No. 22749680.9, Nov. 6, 2024.
Office Action issued in CN Patent Application No. 202280011568.6, Apr. 7, 2025, translation.
Office Action issued in TW Patent Application No. 111104353, dated Oct. 27, 2025, translation.
Office Action issued in VN Patent Application No. 1-2023-05637, dated Nov. 19, 2025, translation.

*Primary Examiner* — Charanjit Aulakh
(74) *Attorney, Agent, or Firm* — GREENBLUM & BERNSTEIN, P.L.C.

(57) ABSTRACT

A compound of the formula (I) or a salt thereof (R represents methyl group or fluorine atom) having an mPGES-1 inhibitory activity and useful as an active ingredient of a medicament for prophylactic and/or therapeutic treatment of such diseases as inflammation, pain, or rheumatism.

(I)

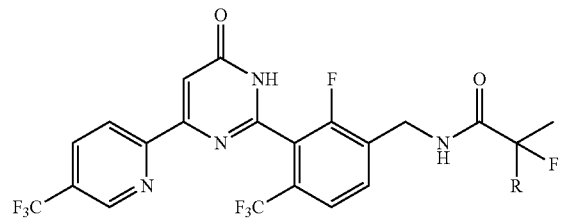

5 Claims, 1 Drawing Sheet

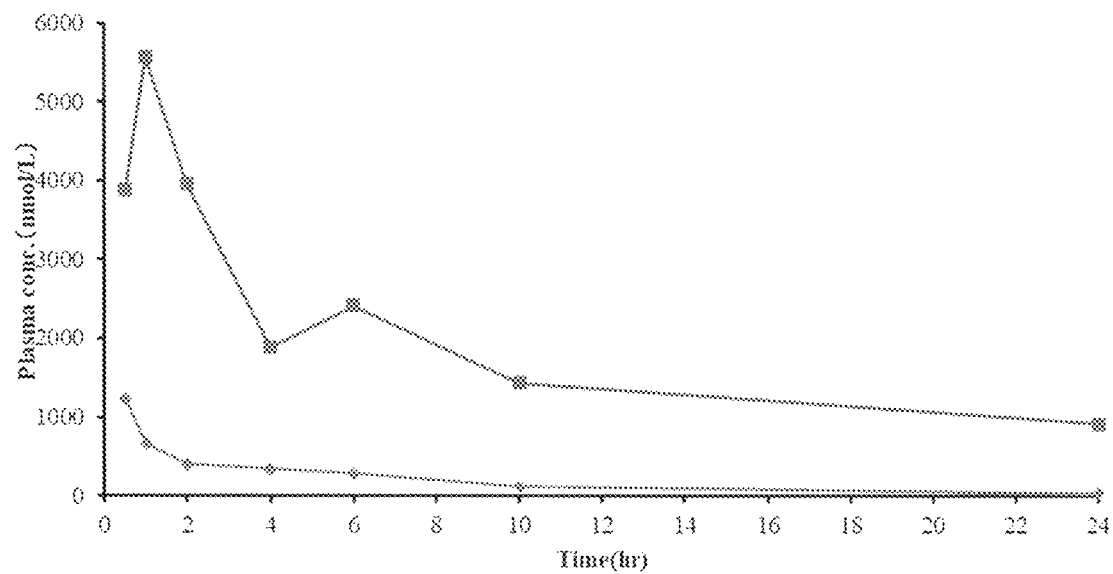

PYRIMIDINE DERIVATIVE

TECHNICAL FIELD

The present invention relates to a novel pyrimidine derivative. More specifically, the present invention relates to a pyrimidine derivative having an mPGES-1 inhibitory action, and useful as an active ingredient of a medicament for prophylactic and/or therapeutic treatment of such diseases as inflammation, pain, and rheumatism.

BACKGROUND ART

Prostaglandin E2 (PGE2) is involved in inflammation, pain, pyrexia, and the like by means of PGE receptors, and can suppress the PGE2 production to suppress inflammation. Non-steroidal anti-inflammatory drugs (NSAIDs) inhibit cyclooxygenase (COX) in the upstream of the prostaglandin biosynthesis pathway, and thereby exhibit anti-inflammatory activity. However, they totally suppress the prostaglandin biosynthesis pathway downstream from the prostanoid production in which COX is involved, and therefore they cause gastric mucosal injury as side effects due to suppression of secretion of gastric mucus or blood flow in gastric mucosa.

There are two types of isozymes of COX, COX-1 and COX-2. Among them, COX-2 is expressed and induced in inflammatory tissues by various inflammation-promoting stimuli (for example, those of cytokines such as interleukin-16). Medicaments that selectively inhibit this COX-2 suppress the production of PGI2, which has vasodilatation and platelet aggregation actions; however, since they do not inhibit the production of thromboxane A2 (TXA2) catalyzed by COX-1 (TXA2 causes vasoconstriction and platelet coagulation), they are considered to increase risk of thrombosis, and increase cardiovascular events, either.

In the downstream of the biosynthesis pathway of PGE2, PGE2 is biosynthesized from PGH2 by the prostaglandin E synthase (PGE synthase, PGES). As PGES, there are three kinds of enzymes, mPGES-1 (microsomal prostaglandin E2 synthase-1), mPGES-2 (microsomal prostaglandin E2 synthase-2), and cPGES (cytosolic PGE synthase). Among them, mPGES-1 is an inducible trimer enzyme, of which expression is increased by inflammatory stimuli (Proc. Natl. Acad. Sci. USA, 96, pp. 7220-7225, 1999), and it is known to participate in cancer, inflammation, pain, pyrexia, tissue repair, and the like.

Since mPGES-1 inhibitors can selectively inhibit the final step of the PGE2 biosynthesis pathway in inflammation lesions (Pharmacol. Rev., 59, pp. 207-224, 2007; J. Biol. Chem., 279, pp. 33684-33695, 2004), they are expected as anti-inflammatory agents that do not cause gastric mucosal injuries, unlike the non-steroidal anti-inflammatory agents. There are also expected efficacies of mPGES-1 inhibitors for prophylactic and/or therapeutic treatment of pain, rheumatism, osteoarthritis, pyrexia, Alzheimer's disease, multiple sclerosis, arteriosclerosis, ocular hypertension such as glaucoma, ischemic retinopathy, systemic scleroderma, malignant tumors such as large intestine tumor, and diseases for which suppression of the PGE2 production exhibits efficacy (refer to International Patent Publication WO2015/125842 for PGE2, PGES, and mPGES-1, as well as uses of mPGES-1 inhibitors, and the like). In addition, it is also known that mPGES-1 inhibitors increase productions of other prostanoids in connection with the suppression of the PGE2 production (J. Biol. Chem., 280, pp. 16579-16585, 2005).

As such mPGES-1 inhibitors, there are known the heterocyclic derivatives disclosed in Japanese Patent No. 5601422, the substituted pyrimidine compounds disclosed in International Patent Publication WO2015/59618, the triazine compounds disclosed in International Patent Publication WO2015/125842, and the like. International Patent Publication WO2015/59618 discloses a pyrimidine compound substituted with p-trifluoromethylphenyl group and 2-chloro-5-isobutyramidobenzyl group (Example 2), and International Patent Publication WO2015/125842 discloses triazine compounds substituted with p-trifluoromethylphenyl group and 2-chloro-5-isobutyramidobenzyl group (Examples 1 to 28).

Further, International Patent Publication WO2017/73709 discloses pyrimidine derivatives substituted with m-phenylene group and having an mPGES-1 inhibitory action, and International Patent Publication WO2019/44868 discloses pyrimidine derivatives substituted with a heterocyclic ring and having an mPGES-1 inhibitory action.

PRIOR ART REFERENCES

Patent Documents
Patent document 1: Japanese Patent No. 5601422
Patent document 2: International Patent Publication WO2015/59618
Patent document 3: International Patent Publication WO2015/125842
Patent document 4: International Patent Publication WO2017/73709
Patent document 5: International Patent Publication WO2019/44868

Non-Patent Documents

Non-patent document 1: Proc. Natl. Acad. Sci. USA, 96, pp. 7220-7225, 1999
Non-patent document 2: Pharmacol. Rev., 59, pp. 207-224, 2007
Non-patent document 3: J. Biol. Chem., 279, pp. 33684-33695, 2004
Non-patent document 4: J. Biol. Chem., 280, pp. 16579-16585, 2005

SUMMARY OF THE INVENTION

Object to be Achieved by the Invention

An object of the present invention is to provide a novel compound having an mPGES-1 inhibitory action, and useful as an active ingredient of a medicament for prophylactic and/or therapeutic treatment of such diseases as inflammation, pain, and rheumatism.

Means for Achieving the Object

The inventors of the present invention conducted various researches in order to achieve the aforementioned object, and evaluated pyrimidine derivatives substituted with m-phenylene group in various ways. As a result, they found that pyrimidine derivatives represented by the following general formula (I) have a potent inhibitory action against mPGES-1, and are useful as active ingredients of medicaments for prophylactic and/or therapeutic treatment of such diseases as inflammation, pain, and rheumatism, and that the pyrimidine derivatives have high solubility, and when they are orally administered, they can rapidly achieve a high blood concentration and reliable expression of the efficacy, and thus accomplished the present invention. The pyrimidine derivatives represented by the following formula are not specifically disclosed in International Patent Publication WO2017/73709.

The present invention thus provides a compound represented by the following general formula (I):

[Formula 1]

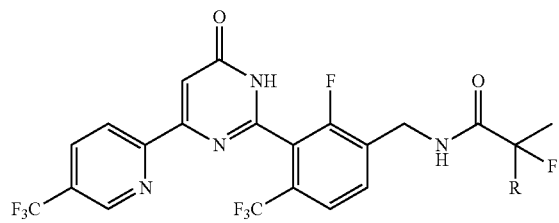

(I)

(in the formula, R represents methyl group or fluorine atom), or a salt thereof.

According to a preferred embodiment of the aforementioned invention, there is provided the compound represented by the aforementioned general formula (I), or a salt thereof, wherein R is methyl group.

As other aspects, the present invention provides an mPGES-1 inhibitor containing a compound represented by the aforementioned general formula (I), or a salt thereof; and a PGE2 biosynthesis inhibitor containing a compound represented by the aforementioned general formula (I), or a salt thereof.

As still another aspect, the present invention provides a medicament containing a compound represented by the aforementioned general formula (I) or a physiologically acceptable salt thereof as an active ingredient. This medicament can be used for prophylactic and/or therapeutic treatment of, for example, inflammation, pain, rheumatism, osteoarthritis, pyrexia, Alzheimer's disease, multiple sclerosis, arteriosclerosis, ocular hypertension such as glaucoma, ischemic retinopathy, systemic scleroderma, malignant tumors such as large intestine tumor, and diseases for which suppression of the PGE2 production exhibits efficacy.

The present invention also provides use of a compound represented by the aforementioned general formula (I) or a salt thereof for manufacture of the aforementioned mPGES-1 inhibitor, the aforementioned PGE2 biosynthesis inhibitor, or the aforementioned medicament; a method for inhibiting mPGES-1 in a living body of a mammal including human, which comprises the step of administrating an effective amount of a compound represented by the aforementioned general formula (I) or a physiologically acceptable salt thereof to the mammal including human; a method for inhibiting biosynthesis of PGE2 in a living body of a mammal including human, which comprises the step of administrating an effective amount of a compound represented by the aforementioned general formula (I) or a physiologically acceptable salt thereof to the mammal including human; and a method for promoting production of a prostanoid other than PGE2 by inhibiting biosynthesis of PGE2 in a living body of a mammal including human, which comprises the step of administrating an effective amount of a compound represented by the aforementioned general formula (I) or a physiologically acceptable salt thereof to the mammal including human.

Effect of the Invention

The compounds represented by the aforementioned general formula (I) and salts thereof provided by the present invention can exhibit a potent inhibitory action against mPGES-1 to inhibit the biosynthesis of PGE2. In addition, the compounds represented by the aforementioned general formula (I) and salts thereof are characterized in that they have high solubility, and when they are orally administered, they can be rapidly absorbed, provide a high blood concentration in a short period of time, and show superior bioavailability. They are also characterized by excellent metabolic stability (stability against cytochrome P450 (CYP) or UDP-glucuronyltransferase (UGT)).

Therefore, the compounds represented by the aforementioned general formula (I) and salts thereof are useful as an active ingredient of a medicament for prophylactic and/or therapeutic treatment of, for example, inflammation, pain, rheumatism, osteoarthritis, pyrexia, Alzheimer's disease, multiple sclerosis, arteriosclerosis, ocular hypertension such as glaucoma, ischemic retinopathy, systemic scleroderma, malignant tumors such as large intestine tumor, and diseases for which suppression of the PGE2 production exhibits efficacy.

BRIEF DESCRIPTION OF DRAWING

FIG. 1 is a graph showing transitions of plasma concentrations of the compound of Example 1 (□) according to the present invention and the compound disclosed in International Patent Publication WO2017/73709, Example 182 (◇) in unchanged states after they are orally administered to male guinea pigs.

MODES FOR CARRYING OUT THE INVENTION

In the aforementioned general formula (I), R represents methyl group or fluorine atom, but R is preferably methyl group.

The compounds of the present invention can be easily produced according to, for example, the synthesis methods for pyrimidine derivatives disclosed in International Patent Publication WO2017/73709. The synthesis methods of the compounds of the present invention are specifically disclosed in the examples mentioned in this specification.

The compounds represented by the general formula (I) may be in the form of salt. The salt is not particularly limited, and appropriately selected depending on the purpose. Examples include, for example, salts with alkali metals such as sodium and potassium; salts with alkaline earth metals such as calcium and magnesium; salts with organic amines such as methylamine, ethylamine, and diethanolamine, mineral acid salts such as hydrochlorides, sulfates, and nitrates, organic acid salts such as p-toluenesulfonates, maleates, and tartrates, and the like.

The compounds represented by the general formula (I) and salts thereof may exist in the form of hydrate or solvate. Type of solvent that forms the solvate is not particularly limited, and examples include, for example, ethanol, ethyl acetate, acetone, and the like.

The compounds of the present invention represented by the general formula (I) have an mPGES-1 inhibitory action, and can inhibit the PGE2 biosynthesis on the basis of the inhibitory action. Therefore, on the basis of the mPGES-1 inhibitory action, the medicament of the present invention containing a compound represented by the general formula (I) or a physiologically acceptable salt thereof of the present invention as an active ingredient can be used for prophylactic and/or therapeutic treatment of, for example, inflammation, pain, rheumatism, osteoarthritis, pyrexia, Alzheimer's disease, multiple sclerosis, arteriosclerosis, ocular hypertension such as glaucoma, ischemic retinopathy, systemic scleroderma, malignant tumors such as large intestine tumor, and diseases for which suppression of the PGE2 production exhibits efficacy.

More specifically, the medicament of the present invention can be used as a medicament for prophylactic and/or therapeutic treatment of, for example, inflammatory colitis, irritable bowel syndrome, migraine, headache, low back pain, lumbar spinal canal stenosis, intervertebral disc herniation, temporomandibular arthrosis, neck-shoulder-arm syndrome, cervical spondylosis, endometriosis, adenomyosis uteri, premature delivery, threatened premature delivery, dysmenorrhea, overactive bladder, bladder outlet obstruction associated with benign prostatic hyperplasia, nocturia, urinary incontinence, neurogenic bladder, interstitial cystitis, bladder pain syndrome, urinary calculus, benign prostatic hyperplasia, chronic prostatitis, intrapelvic pain syndrome, erectile dysfunction, cognitive disorder, neurodegenerative disease, Alzheimer's disease, pulmonary hypertension, psoriasis, rheumatoid arthritis, rheumatic fever, fibromyalgia, neuralgia, complex regional pain syndrome, fascia dyscrasia, ischemic heart disease, hypertension, angina pectoris, viral infectious disorders, bacterial infection, fungal infectious disorders, burn, inflammation and pain after operation, trauma, or extraction of a tooth, malignant tumor, myocardial infarction, atherosclerosis, thrombosis, embolism, type I diabetes mellitus, type II diabetes mellitus, cerebral apoplexy, gout, arthritis, osteoarthritis, juvenile arthritis, ankylosing spondilitis, tenosynovitis, ligamentum osteosis, systemic erythematodes, vasculitis, pancreatitis, nephritis, conjunctivitis, iritis, scleritis, uveitis, wound treatment, dermatitis, eczema, osteoporosis, asthma, chronic obstructive pulmonary disease, fibroid lung, allergic conditions, familial adenomatous polyposis, pachydermia, bursitis, hysteromyoma, or pain in cancer. As for the relation of mPGES-1 inhibitory action and use as medicament, for example, International Patent Publication WO2015/125842 can be referred to. The entire disclosures of this international patent publication and all the references cited therein are incorporated into the disclosure of this specification by reference.

Although a compound represented by the aforementioned general formula (I) or a physiologically acceptable salt thereof as the active ingredient of the medicament of the present invention may be administered as the medicament of the present invention, a pharmaceutical composition for oral or parenteral administration can be preferably prepared by a method well known to those skilled in the art, and administered. Examples of pharmaceutical composition suitable for oral administration include, for example, tablets, powders, capsules, subtilized granules, solutions, granules, syrups, and the like, and pharmaceutical composition suitable for parenteral administration include, for example, injections such as injections for intravenous injection and intramuscular injection, fusion drips, inhalants, eye drops, nose drops, suppositories, transdermal preparations, transmucosal preparations, and the like, but the pharmaceutical composition is not limited to these.

The aforementioned pharmaceutical composition can be produced by a method well known to those skilled in the art using pharmaceutical additives commonly used for preparation of pharmaceutical compositions in this industry. Such pharmaceutical additives are not particularly limited, and can be appropriately chosen depending on form of the pharmaceutical composition, purpose thereof such as impartation of properties for sustained release, and the like. Examples of the pharmaceutical additives include, for example, excipients, binders, fillers, disintegrating agents, surfactants, lubricants, dispersing agents, buffering agents, preservatives, corrigents, perfumes, coating agents, diluents, and the like, but the pharmaceutical additives are not limited to these.

Dose of the medicament of the present invention is not particularly limited, and can be appropriately chosen depending on type of disease to be prevented or treated, purpose of administration such as prevention or treatment, type of active ingredient, weight, age, conditions of patient, administration route, and the like. In the case of oral administration, for example, it can be used at a dose in the range of about 0.01 to 500 mg in terms of weight of the active ingredient as the daily dose for adults. However, the dose can be appropriately chosen by those skilled in the art, and is not limited to the aforementioned range.

EXAMPLES

Hereafter, the present invention will be explained in more detail with reference to examples. However, the present invention is not limited by these examples.

Reference Example: 2-[3-(Aminomethyl)-2-fluoro-6-(trifluoromethyl)phenyl]-6-[5-(trifluoromethyl)pyridin-2-yl]pyrimidin-4(3H)-one

[Formula 2]

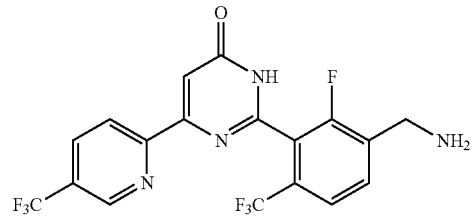

A solution of N-(2-fluoro-3-{6-oxo-4-[5-(trifluoromethyl)pyridin-2-yl]-1,6-dihydropyrimidin-2-yl}-4-(trifluoromethyl)benzyl)isobutylamide (8 g) in concentrated hydrochloric acid (40 mL) was stirred at 130° C. for 9 hours in a sealed tube. The reaction was stopped once, and on the next day, the reaction mixture was stirred again for 8 hours under the same conditions. After 50 mL of water was added to the reaction solution, a solution of sodium hydroxide (17.9 g) in water (120 mL) was added dropwise with ice cooling, the resulting mixture was stirred for a while, and the precipitated solid was taken by filtration and washed with water. The solid was suspended again in t-butyl methyl ether (130 mL), the suspension was refluxed by heating for 1 hour and stirred at room temperature for 30 minutes, and then the suspended solid was taken by filtration to obtain the title compound.

$^1$H-NMR (DMSO-d$_6$, δ): 4.25 (2H, s), 7.42 (1H, brs), 7.94 (1H, d, J=8.4 Hz), 8.03 (1H, t, J=7.6 Hz), 8.32 (1H, d, J=8.4 Hz), 8.39 (1H, dd, J=8.4, 2.0 Hz), 8.62 (2H, brs), 9.15 (1H, s) MS (m/z): 432 (M$^+$)

Example 1: 2-Fluoro-N-(2-fluoro-3-{6-oxo-4-[5-(trifluoromethyl)pyridin-2-yl]-1,6-dihydropyrimidin-2-yl}-4-(trifluoromethyl)benzyl)-2-methylpropanamide

[Formula 3]

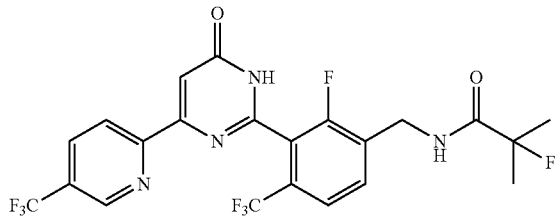

To a solution of 2-[3-(aminomethyl)-2-fluoro-6-(trifluoromethyl)phenyl]-6-[5-(trifluoromethyl)pyridin-2-yl]pyrimidin-4(3H)-one (170 mg) in a mixture of N,N-dimethylformamide (3 mL) and tetrahydrofuran (3 mL), 2-fluoroisobutyric acid (45 µL), triethylamine (109 µL), and O-(7-azabenzotriazol-1-yl)-N,N,N',N'-tetramethyluronium hexafluorophosphate (164 mg) were added, and the resulting mixture was stirred overnight at room temperature. The reaction mixture was extracted with ethyl acetate, then the organic layer was washed once with each of saturated aqueous ammonium chloride, water, and saturated brine in this order, and dried over magnesium sulfate, and the solvent was evaporated under reduced pressure. The resulting residue was purified by silica gel column chromatography, and the solvent was evaporated under reduced pressure. The residue was suspended in t-butyl methyl ether, and taken by filtration to obtain 119 mg of the title compound.

$^1$H-NMR (DMSO-$d_6$, δ): 1.51 (6H, d, J=22.0 Hz), 4.46 (2H, d, J=6.4 Hz), 7.35 (1H, brs), 7.67 (1H, t, J=7.2 Hz), 7.81 (1H, d, J=8.4 Hz), 8.36 (2H, s), 8.87 (1H, m), 9.14 (1H, s), 13.51 (1H, brs) MS (m/z): 520 (M$^+$)

Example 2: 2,2-Difluoro-N-(2-fluoro-3-{6-oxo-4-[5-(trifluoromethyl)pyridin-2-yl]-1,6-dihydropyrimidin-2-yl}-4-(trifluoromethyl)benzyl)propanamide

[Formula 4]

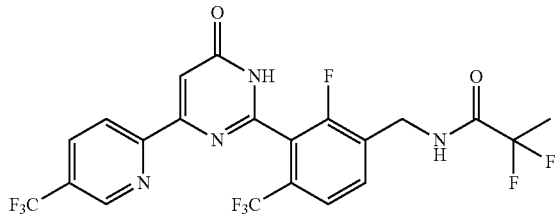

To a solution of 2-[3-(aminomethyl)-2-fluoro-6-(trifluoromethyl)phenyl]-6-[5-(trifluoromethyl)pyridin-2-yl]pyrimidin-4(3H)-one (170 mg) in a mixture of N,N-dimethylformamide (3 mL) and tetrahydrofuran (3 mL), 2,2-difluoropropionic acid (40 µL), triethylamine (109 µL), and O-(7-azabenzotriazol-1-yl)-N,N,N',N'-tetramethyluronium hexafluorophosphate (164 mg) were added, and the resulting mixture was stirred overnight at room temperature. The reaction mixture was extracted with ethyl acetate, then the organic layer was washed once with each of saturated aqueous ammonium chloride, water, and saturated brine in this order, and dried over magnesium sulfate, and the solvent was evaporated under reduced pressure. The resulting residue was purified by silica gel column chromatography, and the solvent was evaporated under reduced pressure. The residue was suspended in a mixed solvent of t-butyl methyl ether and hexane, and taken by filtration to obtain 173 mg of the title compound.

$^1$H-NMR (DMSO-$d_6$, δ): 1.80 (3H, t, J=19.6 Hz), 4.51 (2H, d, J=6.0 Hz), 7.36 (1H, brs), 7.71 (1H, t, J=7.2 Hz), 7.82 (1H, d, J=8.4 Hz), 8.36 (2H, m), 9.14 (1H, s), 9.46 (1H, t, J=6.0 Hz), 13.52 (1H, brs) MS (m/z): 524 (M$^+$)

Test Example 1: Test for mPGES-1 Inhibitory Activity

Microsomes were prepared from COS-1 cells transiently transfected with a plasmid containing human mPGES-1 cDNA, and used as mPGES-1 enzyme. The mPGES-1 enzyme was diluted with a sodium phosphate buffer (pH 7.2) containing reduced glutathione (2.5 mM) and EDTA (1 mM), DMSO or a DMSO solution of a test compound (final concentration of DMSO was 1%) was added to the enzyme, and the mixture was preincubated at 4° C. for 15 minutes. Then, PGH2 as the substrate was added at a final concentration of 1 µM to start the enzymatic reaction, and after incubation at 4° C. for 4 minutes, a solution of ferric chloride (25 mM) and citric acid (50 mM) was added to terminate the enzymatic reaction. Generated PGE2 was measured by using Prostaglandin E2 Express EIA Kit (Cayman Chemical). $IC_{50}$ values were determined by using a standard method.

As a result, it was found that the $IC_{50}$ value of the compound of Example 1 was 1.8 nM. For comparison, the $IC_{50}$ value of the pyrimidine derivative disclosed in International Patent Publication WO2017/73709 (the compound of Example 182 listed in Table 1-11) was similarly measured and found to be 1.2 nM.

Test Example 2: Blood Concentration

The compound of Example 1 and the compound disclosed in International Patent Publication WO2017/73709, Example 182 were weighed in an amount of 10 mg each for a dose of 10 mg/kg, and each compound was finely ground in an agate mortar for about 30 seconds. 0.5% Methyl cellulose 400 solution (Fujifilm Wako Pure Chemicals Co., Ltd.) was added small portionwise to each compound to form a suspension, finally the mortar was washed with a small volume of 0.5% MC400 solution, which was combined with the suspension, and the total volume of the suspension was made to be 10 mL with 0.5% MC400 solution. The suspension was sonicated for approximately 1 minute to prepare a 1 mg/mL solution for administration. The solution was administered to two female guinea pigs at a dose of 10 mL/kg using a flexible oral catheter (RZ-1, Nippon Clea), and blood was collected 0.5, 1, 2, 4, 6, 10, and 24 hours after the oral administration, and centrifuged to obtain plasma. Plasma concentrations of the compounds were measured by the LC-MS/MS (liquid chromatography-tandem mass spectrometry) method. The pharmacokinetic parameters are shown in Table 1 mentioned below.

TABLE 1

| PK parameters | Units | Compounds | |
| --- | --- | --- | --- |
| | | Example 182 | Example 1 |
| $T_{max}$ | hr | 0.5 | 1.5 |
| $C_{max}$ | nmol/L | 1263.4 | 5630.0 |
| $AUC_{0-t}$ | nmol*hr/L | 4704.7 | 42352.0 |
| $AUC_{0-\infty}$ | nmol*hr/L | 4995.4 | 62092.0 |
| $t_{1/2}$ | hr | 6.0 | 13.3 |
| $MRT_{0-\infty}$ | hr | 7.3 | 18.3 |

Mean (n = 2)

Transitions of plasma concentrations of the unchanged compounds are shown in FIG. 1. These results revealed that, in the case of oral administration, the compound of the present invention shows superior bioavailability compared with the comparative compound.

Test Example 3: Metabolic Stability Test (UGT)

DMSO was added to the compound of Example 1 to dissolve the compound, and then acetonitrile and water were added to prepare a test compound solution (10 μM). The test compound solution (final concentration 1 μM), a potassium phosphate buffer (pH 7.4) containing $MgCl_2$ (9 mM) and alamethicin (25 μg/mL), and a rat or guinea pig liver or small intestine microsomal suspension were mixed (final concentration 0.5 mg protein/mL) under ice cooling. After 5 minutes of pre-incubation at 37° C. with stirring, a UDPGA solution (final concentration 2 mM) was added to initiate the reaction. After 5 minutes of incubation at 37° C. with stirring, 3-fold volume of acetonitrile was added, and the resulting mixture was stirred to terminate the enzymatic reaction. The reaction mixture was centrifuged (1500×g, 10 minutes, 4° C.), and the supernatant was mixed with an internal standard solution to prepare a measurement sample. The concentration of the compound in the sample was determined by LC-MS/MS. A sample in which the enzymatic reaction was not allowed was separately prepared, and the concentration measured for this sample was used as the initial value. For comparison, the compound of International Publication WO2017/73709, Example 182 was tested in the same manner. The results for metabolic stability are shown in Table 2 mentioned below. It is clearly revealed that metabolic stability of the compound of the present invention is superior to that of the comparative compound.

TABLE 2

| | Units | Species | Compounds | |
| --- | --- | --- | --- | --- |
| | | | Example 182 | Example 1 |
| UGT metabolic stability | μL/min/mg protein | Rat | 279 | 124 |
| | | Guinea pig | 230 | 130 |

Example 4: Solubility Test

A 10 mM solution of the compound of Example 1 in DMSO was prepared, and diluted 50-fold with JP2 solution (pH 6.8). After incubation for 16 to 24 hours, the test solution was filtered, and the concentration of the compound in the filtrate was determined by HPLC-UV or with a plate reader. For comparison, the compound of International Patent Publication WO2017/73709, Example 182 was tested in the same manner. The results of the solubility test are shown in Table 3 mentioned below. It is clearly revealed that solubility of the compound of the present invention is superior to that of the comparative compound.

TABLE 3

| | Units | Compounds | |
| --- | --- | --- | --- |
| | | Example 182 | Example 1 |
| Solubility | μg/mL | 5.3 | high > 110 |

INDUSTRIAL APPLICABILITY

The compounds represented by the general formula (I) of the present invention have an mPGES-1 inhibitory action, and are useful as an active ingredient of a medicament for prophylactic and/or therapeutic treatment of such diseases as inflammation, pain, or rheumatism.

What is claimed is:

1. A compound represented by the following general formula (I):

[Formula 1]

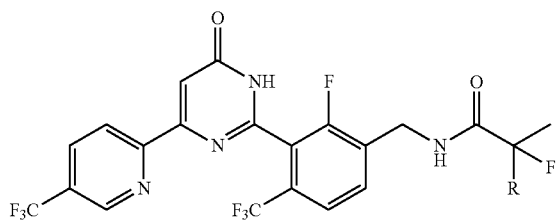

(I)

(in the formula, R represents methyl group or fluorine atom), or a salt thereof.

2. The compound or a salt thereof according to claim 1, wherein R is methyl group.

3. An mPGES-1 inhibitor containing the compound represented by the general formula (I), or a salt thereof according to claim 1.

4. A PGE2 biosynthesis inhibitor containing the compound represented by the general formula (I), or a salt thereof according to claim 1.

5. A medicament containing the compound represented by the general formula (I), or a physiologically acceptable salt thereof according to claim 1.

* * * * *